3,436,653
CAPACITANCE MEASURING MEANS FOR INDICATING CLEARANCE IN GYRATORY CRUSHER AND HAVING MEANS TO COMPENSATE FOR STRAY CAPACITANCE
Tom N. Thiele, Milwaukee, and Lawrence J. Ting, West Allis, Wis., assignors to Allis-Chalmers Manufacturing Company, Milwaukee, Wis.
Filed June 13, 1966, Ser. No. 556,941
Int. Cl. G01r 27/26; B02c 2/00
U.S. Cl. 324—61
14 Claims

ABSTRACT OF THE DISCLOSURE

Capacitance measuring means for indicating clearance between relatively movable gyratory crusher surfaces which form a small variable air gap capacitor includes an insulation sandwich comprising an extended conductive electrode covered on both surfaces by insulation disposed between one crusher surface and the crusher, thereby forming a large shunt capacitor in parallel with the variable air gap capacitor, means to measure the capacitance of the variable air gap capacitor, and means for maintaining said electrode at the same potential as said one crusher surface to thereby prevent said shunt capacitor from influencing said measuring means.

---

This invention relates to means for measuring the clearance between the crushing or grinding surface of a device such as a gyratory crusher, particularly it relates to a measuring means that measures the clearance by relating the clearance to the capacitance between the surfaces.

This invention is applicable to devices or machines that require measuring of the clearance or distance between the crushing or grinding of devices such as gyratory crushers. In most applications of gyratory crushers it is desirable to maintain the clearance between the two crushing surfaces within certain limits. Since the liners used as the grinding surfaces wear rapidly and must be periodically replaced, it is difficult to maintain a relatively constant clearance or a continuing check of the actual clearance during operation.

With this invention, capacitance measuring means are provided that continuously provide an indication of the capacitance which can be correlated to the actual clearance between the grinding surfaces. This continuous indication enables appropriate continuous or periodical adjustments of the clearance to obtain the desired result.

The objects of this invention are to provide a new and improved gyratory crusher; to provide electrical means for continuously indicating the spacing between the crushing surfaces of a device such as a gyratory crusher; to provide capacitance measuring means for indicating the clearance between the crushing surfaces of a device such as a gyratory crusher; to provide capacitance measuring means for indicating the distance between the crushing surfaces of a device such as a gyratory crusher that includes means for compensating for stray or parasitic capacitances present in the device; and to provide a simple and effective means for measuring the clearance between the crushing surfaces of a gyratory crusher or similar device.

Figure 1:
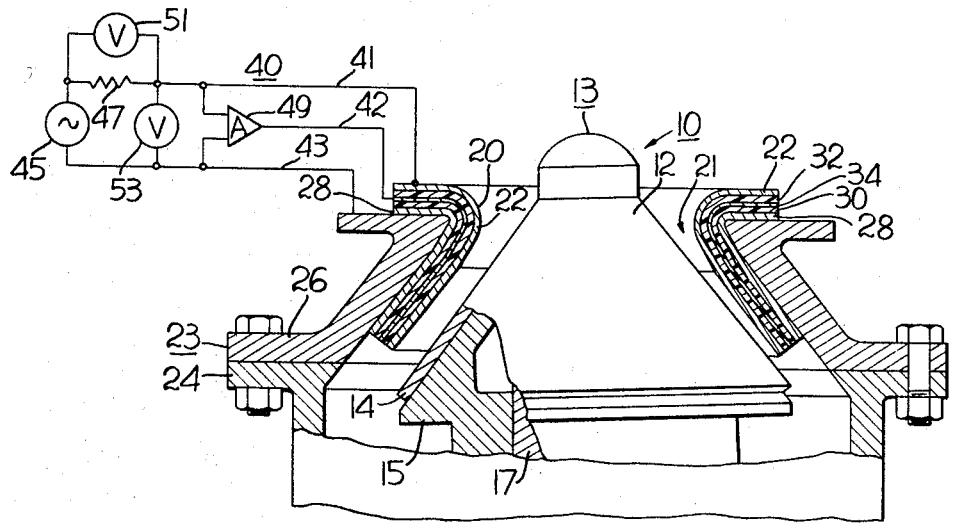
FIG. 1 is a simplified drawing of a gyratory crusher embodying this invention.

Referring to FIG. 1, a gyratory crusher 10 has a first crushing surface 12 created by a rotatable generally coni- cal crushing head 13 made up generally of a liner 14, a base 15 and a shaft 17 eccentrically related to a stationary second crushing surface 20 created by a truncated conical concave liner 22 surrounding the conical crushing head. Concave liner 22 is supported by a conical shell structure 23, comprising a base 24 and a conical shell 26, a conical inner liner 28, a conical inner insulator 30, a conical conductor or electrode 34, and a conical outer insulator 32 adjacent liner 22. A crushing chamber 21 is created between first crushing surface 12 and second crushing surface 20.

A clearance measuring means 40 is connected to the crusher and comprises a first conductor 41 connected to liner 22, a second conductor 42 connected to conical electrode 34, and a third conductor 43 connected to shell structure 23. Conductor 43 is electrically connected to liner 14 and surface 12 through conical shell structure 23, the supporting structure for the crusher (not fully shown), shaft 17 and base 15. In most applications this is an adequate electrical connection. However, in some applications it may be desirable to connect conductor 43 directly to liner 14 through some device such as a slip ring and brush connector.

Clearance measuring means 40 also comprises means for supplying alternating electrical potential such as a source 45 and means for eliminating the capacitance between the crushing surfaces that occurs through the crusher structure. This means for eliminating comprises an operational amplifier 49, a resistor 47, and a voltage measuring means comprising a voltmeter 51 and a voltmeter 53 connected to measure the current and voltage in the circuit. Source 45 is connected to deliver current through resistor 47 to conductors 41 and 43 and to operational amplifier 49 which provides an output at conductor 42.

The desired end result of the clearance measuring means is to measure the distance between liner 22 and liner 14, or, more accurately, between crushing surface 20 and crushing surface 12. With this invention, this is accomplished by measuring the capacitance between surfaces 20 and 12. Since the mechanical structure of the crusher has many places where insulation separates two conductors, there are many stray or parasitic capacitances present. These capacitances are relatively large relative to the capacitance between surfaces 20 and 12 and they must, therefore, be eliminated or compensated for in order to get accurate results.

Figure 2:
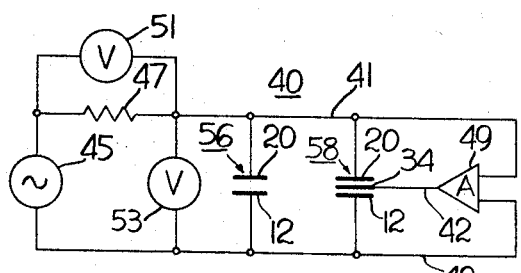
FIG. 2 is a schematic representation of the electrical circuit shown in FIG. 1.

This invention provides means for eliminating the effect of these stray capacitances. The manner in which this is accomplished can be explained by considering the circuit as it is schematically shown in FIG. 2 where similar numerals are provided for parts similar to the parts shown in FIG. 1. As shown in FIG. 1 and FIG. 2, alternating source 45 provides current through resistor 47 to amplifier 49 and voltmeters 51 and 53 to provide a measure of the electrical conditions. Capacitors 56 and 58 are schematic representations of the capacitors appearing in gyratory crusher 10 with the upper plates of capacitances 56 and 58 equivalent to first crushing surface 20 and the lower plates of capacitors 56 and 58 equivalent to second crushing surface 12. However, capacitor 56 represents the capacitance between surfaces 20 and 12 separated by crushing chamber 21 while capacitor 58 represents the capacitance between surfaces 20 and 12 separated by the several conducting and insulating conditions appearing throughout the entire structure of the crusher. The center plate of capacitor 58 is equivalent to conical conductor 34 and is inserted between surfaces 20 and 12 relative to their capacitance relationship through the structure of the crusher.

In operation, source 45 provides electrical energy at a selected frequency through resistor 47 to conductors 41 and 43. The potential between conductors 41 and 43 is supplied as an input to amplifier 49 which produces an output having a potential relative to conductor 43 equal to the potential of the upper plate of capacitors 56 and 58 thereby effectively removing the capacitance of capacitor 58 from the circuit. To accomplish this, amplifier 49 should have a high current, low capacitance output with very small phase shift. It must provide sufficient current between the middle and lower plate of capacitance 58, that is, between electrode 34 and liner 20 to maintain the voltage of the middle plate of capacitor 58 at the same level as the upper plate of capacitor 58. Since the middle plate and upper plate of capacitor 58 are at the same potential, there is zero voltage between the plates, and therefore, no capacitance effect resulting from capacitor 58. The only capacitance appearing is that of capacitor 56, that is, the capacitance between surfaces 20 and 12 separated by chamber 21.

To actually measure the clearance, a correlation is first made between the measured capacitance and the actual clearance between the crushing surfaces. Once this is established and since capacitance is inversely proportional to the distance between the surfaces, the distance between the surfaces can be changed to obtain the desired readings on voltmeter 51, connected to give a current reading, and voltmeter 53, connected to give a voltage reading.

Figure 3:
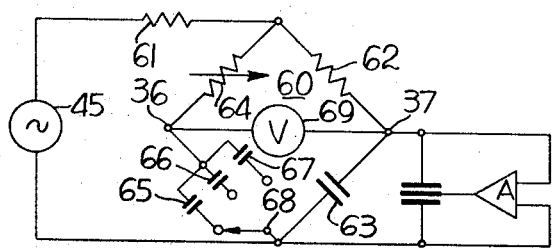
FIG. 3 is a schematic representation of another circuit embodying the invention.

In another embodiment shown in FIG. 3, source 45 provides an alternating electrical source through a resistor 61 to a bridge circuit 60 which comprises a resistor 62 and a capacitor 63, which is equivalent to capacitor 56 shown in FIG. 2, in one leg; and a potentiometer 64 and three parallelly connected capacitors 65, 66 and 67 and a multiple pole switch 68 in the other leg. A voltmeter 69 is connected between terminals 36 and 37 and is used to balance the bridge to indicate that the leg of potentiometer 64 has the same impedance to the source as the leg of resistor 62. The capacitance of capacitor 63, and, therefore, the clearance between crushing surfaces 20 and 12, is determinable when the reading on voltmeter 69 is zero indicating that the bridge is balanced because the resistance of potentiometer 64, the capacitance selected by switch 68, and the resistance of resistor 62 are known. With this information the capacitance of capacitor 63 can be calculated, or the clearance between surfaces 20 and 12 can be adjusted to obtain the preselected null.

The embodiments of the invention in which an exclusive property or privilege is claimed are defined as follows:

1. Clearance measuring means for a conductive gyratory crusher provided with first and second spaced apart relatively movable crushing surfaces, said first crushing surface being electrically connected to said crusher and said first and second crushing surfaces forming a relatively small variable capacitor therebetween through the air gap separating them, an insulation sandwich comprising an extended conductive electrode and insulation covering both surfaces of said electrode disposed between said second crushing surface and said crusher, said second crushing surface and said crusher forming a relatively large shunt capacitor effectively in parallel with variable air gap capacitor,
  an alternating current source,
  means in circuit with said electrode and having said alternating current source as an input for eliminating only the electrical effect of said shunt capacitor, and
  means including said alternating current source for measuring the capacitance of said variable air gap capacitor as an indication of the spacing between said first and second crushing surfaces.

2. Clearance measuring means according to claim 1 wherein said first crushing surface is created by a centrally located gyratory conical crushing head located eccentrically to the second crushing surface, said second crushing surface is created by a truncated conical concave liner surrounding said first crushing surface, and wherein said electrode is located adjacent said second surface conical concave liner.

3. Clearance measuring means in accordance with claim 2 wherein said crusher has a truncated conical concave portion surrounding said liner and electrically connected to said crushing head and said insulating sandwich is disposed between said concave portion and said concave liner.

4. Clearance measuring means according to claim 1 wherein said means for measuring includes means for measuring the potential between the first and second crushing surfaces and the current provided by said alternating current source.

5. Clearance measuring means according to claim 1 wherein said means for measuring comprises an adjustable resistance-capacitance bridge having said variable capacitor between the first and second crushing surfaces constituting one of the legs of said bridge and said means for measuring also includes means for adjusting the bridge and indicating when the bridge is balanced.

6. Clearance measuring means in accordance with claim 1 wherein said alternating current source is connected between said first and second crushing surfaces and said means for eliminating the electrical effect of said shunt capacitor includes means for maintaining said electrode at the same potential as said second crushing surface.

7. Clearance measuring means in accordance with claim 6 wherein said means for eliminating the electrical effect of said shunt capacitor includes an operational amplifier having its input terminals connected across said first and second crushing surfaces and its output terminals connected between said electrode and said crusher.

8. Clearance measuring means according to claim 7 wherein said first crushing surface is created by a centrally located gyratory conical crushing head located eccentrically to the second surface, said second crushing surface is created by a truncated conical concave liner surrounding said first crushing surface, and said electrode surface is located adjacent the second surface conical concave liner.

9. Clearance measuring means according to claim 8 wherein said means for measuring comprises means for measuring the potential between the first and second crushing surfaces and the current provided by said alternating current source.

10. Clearance measuring means for a conductive gyratory crusher provided with first and second spaced apart, relatively movable crushing surfaces, said first crushing surface being electrically connected to said crusher and said first and second crushing surfaces forming a relatively small variable capacitor therebetween through the air gap separating them, insulating means including an extended conductive electrode and insulation covering both surfaces of said electrode disposed between said second crushing surface and said crusher, said second crushing surface and said crusher forming a relatively large shunt capacitor effectively in parallel with said variable capacitor,
  means including an alternating current source for measuring the capacitance of said variable capacitor, and
  means in circuit with said electrode and having said alternating current source as an input for preventing said shunt capacitor from influencing said means for measuring the capacitance of said variable capacitor, said means for preventing including means for driving current through the portion of said shunt capacitor formed between said electrode and one of said crushing surfaces.

11. Clearance measuring means in accordance with claim 10 wherein said alternating current source is connected across said first and second crushing surfaces and said means for preventing said shunt capacitor from influencing said measuring means includes means for maintaining said electrode and said second crushing surface at the same potential.

12. Clearance measuring means in accordance with claim 11 wherein said means for preventing said shunt capacitor from influencing said measuring means includes an operational amplifier having its input terminals connected between said first and second crushing surfaces and its output terminals connected between said electrode and said crusher and said operational amplifier drives sufficient current between said electrode and said crusher to maintain the voltage of said electrode at the same level as that of said second crushing surface.

13. Clearance measuring means according to claim 12 wherein said first crushing surface is created by a centrally located gyratory conical crushing head located eccentrically to the second surface, said second surface is created by a truncated conical concave liner surrounding said first surface, and said electrode surface is located adjacent the second surface conical concave liner.

14. Clearance measuring means for a gyratory crusher comprising:
- a first crushing surface and a second crushing surface surrounding and spaced apart from said first surface;
- a third surface surrounding and adjacent said second surface, said third surface including an electrode and a pair of insulators covering both sides of said electrode;
- a fourth surface surrounding and adjacent said third surface;
- means electrically connecting said first and fourth surfaces;
- means for supplying alternating electrical energy across said second and fourth surfaces;
- means for applying alternating electrical energy to said electrode to eliminate only the electrical effect of the capacitance appearance between said second and fourth surfaces; and
- means for measuring the resulting capacitance between said first and second surfaces.

References Cited
UNITED STATES PATENTS
3,189,268   6/1965   Nilsson _____ 324—61 X RUDOLPH V. ROLINEC, *Primary Examiner.*

E. E. KUBASIEWICZ, *Assistant Examiner.*